Dec. 9, 1969  J. I. THIGPEN  3,483,452
CAPACITORS WITH POLYPROPYLENE FILM AND LIQUID DIELECTRICS
Filed Sept. 11, 1968  2 Sheets-Sheet 1

JONATHAN I. THIGPEN
INVENTOR.

BY *William L. Powell*

ATTORNEY

Dec. 9, 1969   J. I. THIGPEN   3,483,452
CAPACITORS WITH POLYPROPYLENE FILM AND LIQUID DIELECTRICS
Filed Sept. 11, 1968   2 Sheets-Sheet 2

JONATHAN I. THIGPEN.
INVENTOR.

BY William L. Peverill

ATTORNEY

United States Patent Office 3,483,452
Patented Dec. 9, 1969

3,483,452
CAPACITORS WITH POLYPROPYLENE FILM AND LIQUID DIELECTRICS
Jonathan I. Thigpen, Terre Haute, Ind., assignor to Hercules Incorporated, Wilmington, Del., a corporation of Delaware
Filed Sept. 11, 1968, Ser. No. 759,183
Int. Cl. H01g 3/095, 3/175
U.S. Cl. 317—258                    3 Claims

ABSTRACT OF THE DISCLOSURE

Electrical capacitors containing polypropylene spacer sheets are impregnated with a solution of atactic polypropylene in a halogenated aromatic organic compound.

---

Figure 1:
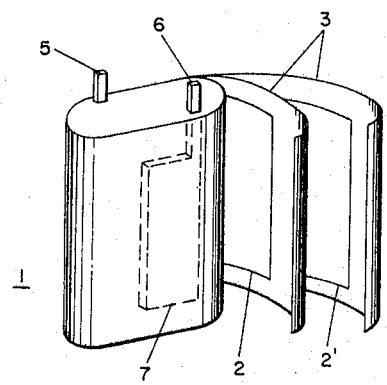

This invention relates to electrical capacitors or condensers. More particularly, it relates to such capacitors containing as the dielectric spacer sheets, polypropylene film, and as the dielectric impregnating liquid, a solution of atactic polypropylene.

An electrical capacitor is comprised generally of a pair of conductive electrodes separated by a dielectric spacer material and impregnated with a dielectric liquid. The function of the dielectric liquid is to completely occupy the void spaces between the spacer material and the conductor, as, e.g. may be occasioned by irregularities in the surfaces of those members, as well as any voids within the dielectric material. Failure to have these spaces occupied raises the possibility of corona discharge at these points when an electrical charge is passed into the capacitor. Such dielectric liquids as mineral oil, castor oil, silicone oil and halogenated hydrocarbons have been extensively used in this application in the past.

Capacitor dielectric spacers in the past have been made of cellulosic materials, principally high grade kraft paper. More recently, polypropylene has been replacing paper in this application in many cases. Polypropylene films are superior to paper in that they have higher dielectric strength, i.e., ability to withstand higher voltage stresses per unit of thickness, they are less subject to flaws and defects such as pinholes or conducting particles which decrease breakdown voltage and they have better power factor characteristics which decrease dielectric loss. Thus, capacitors with synthetic polypropylene film dielectric spacers can usually be smaller than those made with paper while having equivalent or better capacitance and voltage ratings.

However, polypropylene film, as a dielectric spacer material, is subject to at least one troublesome drawback. This is that it is not readily wetter by any of the conventional dielectric liquids which would ordinarily be employed therewith in preparing capacitors. For this reason, the impregnating liquid frequently fails to occupy completely all of the space between the dielectric and the conductor and thus corona discharge is not prevented, leading to premature breakdown and shortened operational life of the capacitor. It has been proposed to improve the impregnation of capacitors containing polypropylene film by incorporating a layer of paper between adjacent layers of the dielectric film and/or the conductor. The paper, being porous, can serve as a wick to draw the dielectric liquid into better contact with the film. This technique does not yield 100% void-free dielectrics and it also adds to the bulk of the capacitor.

In accordance with this invention it has been found that good electrical capacitors can be prepared from polypropylene film if there is employed, as the dielectric impregnating liquid, a saturated solution of atactic polypropylene in a chlorinated liquid hydrocarbon. The chlorinated liquid hydrocarbons, particularly the aromatics, are a preferred class of dielectric liquids for use with polypropylene dielectric spacer sheets, generally, but as stated, they do not wet the film as would be desired, leading to the troubles attendant on the presence of voids in the dielectric. When the halogenated dielectric liquid is saturated with atactic polypropylene, its wetting qualities are significantly enhanced and these problems are relieved. Good capacitors can be prepared without the need for the aforesaid paper interlayer to serve as a wick.

Stated more specifically, this invention is an electrical capacitor comprising a pair of conductive electrodes separated by a dielectric spacer, said dielectric spacer comprising one or more layers of a thin stereoregular polypropylene film and a saturated solution of atactic polypropylene in a halogenated hydrocarbon liquid.

It is important to distinguish, for purposes of this specification, between the several types of polypropylene which are present in these capacitors. The polymer employed for the dielectric sheets comprises generally at least about 95% of the stereoregular or isotactic type polymer. This material is frequently referred to as crystalline polypropylene but it does not always exist in the crystalline state. In fact, it seldom exhibits crystallinity greater than about 65 to 80%. That is to say, for steric and other reasons, all of the crystallizable molecules do not fit into the crystal lattice structure of the crystallized polymer. The uncrystallized portion, though it remains amorphous, is, however, stereoregular and crystallizable.

Atactic polypropylene is characterized by lack of stereoregularity and is a substantially totally amorphous material. This material, soluble in most hydrocarbon solvents, is not crystallizable at all under normal conditions. It is formed as a byproduct of the preparation of stereoregular polypropylene. Being hydrocarbon soluble, the atactic portion dissolves in the reaction diluent and is recovered therefrom during reclamation of the diluent. The atactic polymer also can make up as much as about 5% of the dielectric film polymer. It should be realized, however, that the soluble, amorphous, atactic polymer is a different material entirely from the amorphous, uncrystallized portion of the stereoregular polymer which makes up the remainder of the dielectric film. That material is insoluble in the dielectric liquid, and, in fact, is inseparable from the crystallized polymer.

As stated, the preferred dielectric liquids, which are also good solvents for the atactic polypropylene, are halogenated aromatic hydrocarbons, and most preferably, halogenated polyphenyls. The polyphenyl can contain from 1 to about 5 halogen atom substituents. The most commonly used liquid is trichlorodiphenyl.

The reference to a saturated solution is intended to convey the meansing that the solution should be saturated at any temperature at which the capacitor is operated, up to about 120° C. There will probably be some precipitated or undissolved atactic polymer dispersed in the solution at lower temperatures in most cases, but this is not harmful to the dielectric qualities of the solution. Atactic polypropylene is soluble in trichlorodiphenyl to the extent of about 0.5% at room temperature and up to about 10% at 120° C. Thus if the dielectric liquid is not already saturated when the temperature is raised to 120° C., it can dissolve the small atactic portion out of the dielectric polymer film. When this happens, the film is weakened and the high temperature breakdown voltage of the film is decreased accordingly.

Films of the stereoregular polypropylene can be prepared by any of the techniques known to the art, as, e.g. by extrusion, solvent casting or rolling. Preferably, the films are drawn to orient them and thus improve their mechanical properties. Orientation can be either uniaxial or biaxial. In most cases, the films are biaxially oriented.

Figure 2:
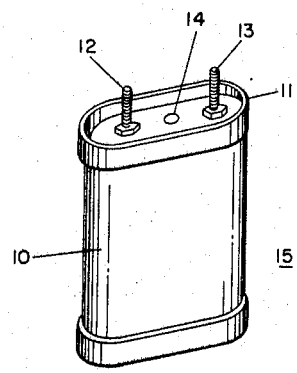
Figure 3:
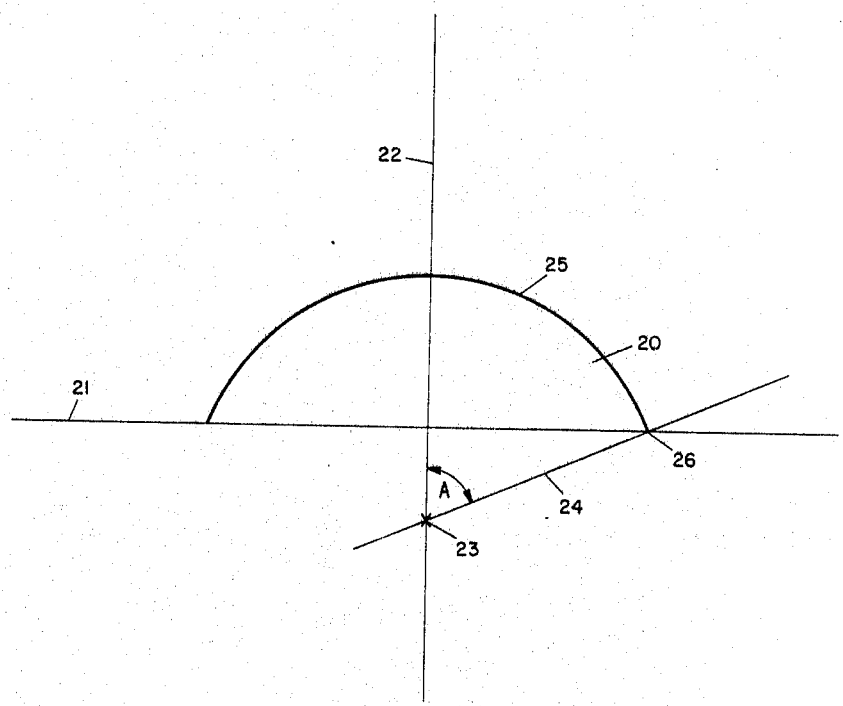

A typical capacitor construction is shown in FIG. 1 and FIG. 2 where FIG. 1 is a perspective view of a partially uncoiled rolled capacitor assembly and FIG. 2 is a perspective view of the same capacitor encased in a container. FIG. 3 illustrates the technique employed for evaluating the wetting characteristics of the atactic polymer solution on film which is explained more fully hereinafter.

The capacitors of this invention are constructed in the usual manner except for the dielectric impregnating liquid employed. With reference to the drawings, the capacitor assembly 1 of FIG. 1 can be made by convolutely winding strips 2 and 2' of metal foil such as aluminum, copper, tantalum, etc., with an interleaved dielectric polypropylene film 3.

Electrical contact with the electrodes can be made by laid-in tap straps 5 and 6 having their ends protruding from one end of the rolled capacitor assembly. The tap straps can be welded to the electrodes, if desired, to obtain a better contact, and the lower part of the straps 5 and 6 can be enlarged as at 7 to provide a larger contact area with its cooperating electrode.

Prior to impregnation, the electrode-spacer assembly 1 is usually placed in a container such as the metal container 10 shown in FIG. 2, and the cover 11 is hermetically sealed to the container. Before the cover is sealed on the container, the contact tap straps 5 and 6 are respectively affixed to the terminals 12 and 13 extending through and insulated from the cover. In order to allow withdrawal of moisture and air from the assembly and the introduction of the impregnating liquid, a small hole 14 is provided in the cover 11.

Before impregnation, the capacitor assemblies are normally vacuum dried to remove residual moisture. The drying temperature will vary depending on the length of the drying cycle, but usually ranges from about 60° C. to about 150° C. With too low a temperature, the drying period is excessively long while too high a temperature can cause decomposition and shrinkage of the dielectric spacer.

The impregnating dielectric liquid is admitted to the capacitor assembly through hole 14 preferably while the dried assembly is still under vacuum in a suitable evacuated enclosure. Usually, sufficient impregnating liquid is introduced to at least submerge the capacitor element in the container. The pressure in the enclosure is then raised to atmospheric, and the assembly permitted to stand for a number of hours for thorough penetration of the liquid impregnant. After impregnation, the capacitor unit is sealed, as by applying a suitable quantity of solder to hole 14. In addition to the foregoing processes, other techniques which generally utilize heat and/or pressure, can be utilized to aid in the impregnating process.

The improved performance of the capacitors of this invention as compared to prior art capacitors is believed to be the result of improved wetting of the polypropylene film by the amorphous polypropylene solution with which the capacitor is impregnated. The degree of wetting of the film is indicated by the drop contact angle, measurement of which is illustrated in FIG. 3. Two drops of the solution are made to fall one inch from a number 18 hypodermic needle onto the film. Using a 35 mm. projector, the image 20 of the droplet is projected onto a vertical sheet of paper in such a way that the droplet-film interface coincides with a horizontal base line 21 drawn on the paper. The droplet outline is traced on the paper and a line 22 perpendicular to the base line is drawn, dividing the droplet in half. A point 23 on the perpendicular is then located from which a radius 24 will follow the general curve 25 of the image. This radius is extended through the perpendicular bisector and the point of intersection 26 of the droplet image and the base line. The angle A between the radius line and the perpendicular bisector is the contact angle. Better wetting of the film is indicated by lower contact angles. A drop of trichlorodiphenyl makes an angle of 44°, whereas that of a 0.25% solution of atactic polypropylene in trichlorodiphenyl is about 36° and that of a 0.5% solution is 32°.

EXAMPLES

A series of 150 KVAR (kilovolt ampere reactive) capacitors were prepared employing biaxially oriented stereo regular polypropylene film as the dielectric spacer, and using procedures known in the art and set forth hereinabove. These capacitors were designed for a rated voltage of 7200 volts.

These capacitors were divided into four groups as follows:

(A) This group was prepared with two sheets of the 0.5 mil polypropylene film between the electrodes and a single sheet of 0.3 mil capacitor grade kraft paper between the sheets of polymer. These were impregnated with highly purified trichlorodiphenyl.

(B) This group was the same as Group A except that prior to sealing, sufficient atactic polypropylene was added to prepare a 10% solution when the impregnating liquid was added and heated to 120° C.

(C) This group was prepared using 2 sheets of 0.5 mil polypropylene film, but no paper as the dielectric spacer sheet. These were impregnated with pure trichlorodiphenyl.

(D) This group is identical to Group C except that, prior to sealing, sufficient atactic polypropylene was added to yield a 10% solution when the impregnating liquid was added and heated to 120° C.

Capacitors from each of these groups were subjected to standard electrical capacitor tests to demonstrate the improvement in dissipation factor, corona starting voltage (CSV) and the dielectric breakdown voltage effected by the capacitors of this invention. The results of these tests are shown in the following table:

| Group | Dielectric composition | Dissipation factor, percent (at 85° C.) | Corona starting voltage (60 Hz A.C.) | Dielectric breakdown voltage[1], volts/mil |
|---|---|---|---|---|
| A | Film/paper/film, 0.5 mil/0.3 mil/0.5 mil (no atactic polypropylene added to Aroclor).[2] | 0.07–0.09 | 13,000–14,500 | 2,000–2,900 |
| B | Film/paper/film, 0.5 mil/0.3 mil/0.5 mil (10% solution of atactic polypropylene in Aroclor).[2] | 0.07–0.08 | 13,500–14,000 | 5,400–5,900 |
| C | Film/film, 0.5 mil/0.5 mil (no atactic polypropylene added to Aroclor).[2] | 0.01–0.03 | 6,500–13,000 | 2,500–3,300 |
| D | Film/film, 0.5 mil/0.5 mil (10% solution of atactic polypropylene in Aroclor).[2] | 0.1–0.03 | 13,500–14,500 | 5,500–5,800 |

[1] After holding capacitors at 100° C. for 240 hours.
[2] Aroclor=Trade name for capacitor grade trichlorodiphenyl manufactured by Monsanto Company.

It will be seen, by comparing the capacitors in Group A and B with those in Group C and D that removal of the paper leads to lower dissipation factors because the paper wick saturated with dielectric liquid has a higher dissipation factor than the polypropylene film and dielectric liquid. However, the CSV was lowest and most erratic in the capacitors of Group C where pure trichlorodiphenyl was employed without the benefit of the paper wick. This is attributed to poor impregnation by the dielectric liquid, leaving air pockets between the electrodes which ionize, causing corona discharge as the AC voltage is raised. In Group D, where the atactic polymer solution is used without paper wicks, the CSV is much higher, indicating better impregnation.

The addition of atactic polypropylene also had another important effect. It improved the high temperature performance characteristics of the capacitors. This is shown by comparison of the dielectric breakdown voltages (after treatment at 100° C. for 10 days) of Groups A and C with Groups B and D. This result is due to the fact that the trichlorodiphenyl in the capacitor was saturated with atactic polypropylene; therefore, there was no tendency of the trichlorodiphenyl to dissolve out the small atactic non-stereoregular polypropylene portion of the dielectric film sheets. Loss in atactic portions from the film would result in weak portions and lower the breakdown voltage.

What I claim and desire to protect by Letters Patent is:

1. An electrical capacitor comprising a pair of conductive electrodes separated by a dielectric spacer, said dielectric spacer comprising a thin stereoregular polypropylene film, and a dielectric liquid comprising a saturated solution of atactic polypropylene in a halogenated hydrocarbon liquid.

2. The capacitor of claim 1 where the halogenated hydrocarbon is trichlorodiphenyl.

3. The capacitor of claim 1 where the polypropylene film is biaxially oriented.

References Cited

UNITED STATES PATENTS

| | | | |
|---|---|---|---|
| 3,229,024 | 1/1966 | Kang | 174—25 |
| 3,363,156 | 1/1968 | Cox | 317—258 X |

E. A. GOLDBERG, Primary Examiner

U.S. Cl. X.R.

252—66